US008898318B2

(12) United States Patent
Galvin et al.

(10) Patent No.: US 8,898,318 B2
(45) Date of Patent: Nov. 25, 2014

(54) DISTRIBUTED SERVICES AUTHORIZATION MANAGEMENT

(75) Inventors: Thomas A. Galvin, Amherst, NH (US); Bruce W. Copeland, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 12/793,277

(22) Filed: Jun. 3, 2010

(65) Prior Publication Data

US 2011/0302315 A1 Dec. 8, 2011

(51) Int. Cl.
| | |
|---|---|
| G06F 9/46 | (2006.01) |
| H04L 12/24 | (2006.01) |
| G06F 9/50 | (2006.01) |
| H04L 29/08 | (2006.01) |
| H04L 29/06 | (2006.01) |
| G06F 15/16 | (2006.01) |

(52) U.S. Cl.
CPC H04L 63/10 (2013.01); G06F 9/46 (2013.01); H04L 41/5096 (2013.01); G06F 9/5027 (2013.01); G06F 15/16 (2013.01); H04L 29/08549 (2013.01); H04L 67/1097 (2013.01); H04L 63/0823 (2013.01); H04L 67/10 (2013.01)
USPC ........... 709/228; 709/226; 709/225; 709/215; 709/214; 709/216

(58) Field of Classification Search
CPC ... H04L 29/06; H04L 63/10; H04L 29/08549; H04L 41/5096; H04L 67/10; H04L 67/1097; G06F 15/16; G06F 9/5027; G06F 9/46

USPC .......................................... 709/228, 226, 225
See application file for complete search history.

(56) References Cited

U.S. PATENT DOCUMENTS

| | | | |
|---|---|---|---|
| 5,235,642 A | | 8/1993 | Wobber et al. |
| 5,294,096 A | * | 3/1994 | Muller .......................... 266/237 |
| 5,649,196 A | * | 7/1997 | Woodhill et al. ............. 711/148 |
| 6,212,521 B1 | * | 4/2001 | Minami et al. ................ 707/613 |

(Continued)

OTHER PUBLICATIONS

"IBM Tivoli Access Manager WebSEAL Overview", Retrieved at << http://publib.boulder.ibm.com/tividd/td/ITAME/SC32-1134-01/en_US/HTML/amweb41_admin04.htm >>, Retrieved Date: Mar. 26, 2010, pp. 17.

(Continued)

Primary Examiner — O. C. Vostal
(74) Attorney, Agent, or Firm — Bryan Webster; Kate Drakos; Micky Minhas

(57) ABSTRACT

One or more techniques and/or systems are disclosed for providing resource authorization to users of a distributed memory store (e.g., a distributed web-based cloud service). A session ID that identifies a location of an authorization document in a distributed memory store is used to access the authorization document, which comprises a global section with a principal ID related to a user. The user can be authorized to utilize a resource (e.g., in a distributed cloud service) if a resource section is present for the principal ID in the authorization document, and has appropriate resource data for the resource. If the resource section is not present, it can be created in the authorization document, and identified by a resource identifier. Authorization data can be loaded into the newly created resource section, and the authorization document, with the global and resource sections, is saved to a local cache for the distributed memory store.

20 Claims, 9 Drawing Sheets

(56) References Cited

U.S. PATENT DOCUMENTS

| | | | |
|---|---|---|---|
| 6,850,940 B2 * | 2/2005 | Wesinger et al. | 1/1 |
| 6,959,291 B1 * | 10/2005 | Armstrong et al. | 705/59 |
| 7,228,300 B2 | 6/2007 | Lei et al. | |
| 7,272,639 B1 | 9/2007 | Levergood et al. | |
| 7,334,038 B1 * | 2/2008 | Crow et al. | 709/227 |
| 7,379,990 B2 * | 5/2008 | Tsao | 709/223 |
| 7,685,206 B1 | 3/2010 | Mathew et al. | |
| 7,962,565 B2 * | 6/2011 | Coker | 709/217 |
| 8,028,039 B1 * | 9/2011 | Hawkins | 709/219 |
| 8,099,511 B1 * | 1/2012 | Ganesan et al. | 709/231 |
| 8,103,772 B2 * | 1/2012 | Schreter | 709/226 |
| 8,130,764 B1 * | 3/2012 | Salkewicz | 370/398 |
| 8,140,647 B1 * | 3/2012 | Juillard | 709/219 |
| 8,229,985 B2 * | 7/2012 | Turner et al. | 707/791 |
| 8,238,327 B2 * | 8/2012 | Schneider et al. | 370/352 |
| 2004/0122862 A1 * | 6/2004 | Todd | 707/104.1 |
| 2004/0128546 A1 * | 7/2004 | Blakley et al. | 713/201 |
| 2004/0230674 A1 * | 11/2004 | Pourheidari et al. | 709/223 |
| 2006/0053216 A1 * | 3/2006 | Deokar et al. | 709/223 |
| 2006/0080546 A1 * | 4/2006 | Brannon et al. | 713/185 |
| 2006/0116952 A1 * | 6/2006 | Orfano | 705/38 |
| 2006/0206609 A1 * | 9/2006 | Ganesan et al. | 709/226 |
| 2006/0271601 A1 * | 11/2006 | Fatula et al. | 707/201 |
| 2007/0038500 A1 * | 2/2007 | Hammitt et al. | 705/9 |
| 2007/0073829 A1 * | 3/2007 | Volodarsky et al. | 709/217 |
| 2007/0086438 A1 * | 4/2007 | Schneider et al. | 370/352 |
| 2007/0263590 A1 * | 11/2007 | Abileah et al. | 370/351 |
| 2008/0066181 A1 * | 3/2008 | Haveson et al. | 726/26 |
| 2008/0082538 A1 * | 4/2008 | Meijer et al. | 707/9 |
| 2008/0104393 A1 * | 5/2008 | Glasser et al. | 713/165 |
| 2009/0228950 A1 | 9/2009 | Reed et al. | |
| 2009/0228967 A1 | 9/2009 | Gbadegesin et al. | |
| 2010/0100377 A1 * | 4/2010 | Madhavapeddi et al. | 704/235 |
| 2010/0228819 A1 * | 9/2010 | Wei | 709/203 |
| 2010/0235579 A1 * | 9/2010 | Biles et al. | 711/125 |
| 2010/0257456 A1 * | 10/2010 | Lieb et al. | 715/741 |
| 2010/0299553 A1 * | 11/2010 | Cen | 714/4 |
| 2010/0333116 A1 * | 12/2010 | Prahlad et al. | 719/328 |
| 2011/0022812 A1 * | 1/2011 | van der Linden et al. | 711/163 |
| 2011/0055161 A1 * | 3/2011 | Wolfe | 707/652 |
| 2011/0055683 A1 * | 3/2011 | Jiang | 715/234 |
| 2011/0113466 A1 * | 5/2011 | Stringham et al. | 726/1 |
| 2011/0116376 A1 * | 5/2011 | Pacella et al. | 370/235 |
| 2011/0125894 A1 * | 5/2011 | Anderson et al. | 709/224 |
| 2011/0126197 A1 * | 5/2011 | Larsen et al. | 718/1 |
| 2011/0126269 A1 * | 5/2011 | Youngworth | 726/4 |
| 2011/0131335 A1 * | 6/2011 | Spaltro et al. | 709/228 |
| 2011/0137947 A1 * | 6/2011 | Dawson et al. | 707/785 |
| 2011/0153644 A1 * | 6/2011 | Kosuru et al. | 707/769 |
| 2011/0213765 A1 * | 9/2011 | Cui et al. | 707/711 |
| 2011/0214176 A1 * | 9/2011 | Burch et al. | 726/15 |
| 2011/0231612 A1 * | 9/2011 | Karlsson et al. | 711/119 |
| 2011/0246732 A1 * | 10/2011 | Amano et al. | 711/162 |
| 2012/0197962 A1 * | 8/2012 | Maenpaa et al. | 709/201 |

OTHER PUBLICATIONS

Dasgupta, Arnab., "Use PLAM to speed distributed transactions", Retrieved at << http://www.ibm.com/developerworks/linux/library/l-plam/index.html >>, May 18, 2005, pp. 11.

"Behind Live Mesh: Authorization and encryption", Retrieved at << http://blogs.msdn.com/livemesh/archive/2008/05/29/behind-live-mesh-authorization-and-encryption.aspx >>, May 29, 2008, pp. 8.

* cited by examiner

US 8,898,318 B2

DISTRIBUTED SERVICES AUTHORIZATION MANAGEMENT

BACKGROUND

Distributed, web-based services are typically called cloud services, and they provide shared resources, services, software and information on demand. These cloud services are typically distributed among a plurality of servers, clusters of servers, and/or datacenters comprising clusters. Users access the cloud services by accessing the Internet, and authenticating themselves to the particular service. Cloud services often need to scale to hundreds of millions of users, and billions of resources, which are typically partitioned into scale units that are capable of allowing efficient access to those resources (e.g., in datacenters, and/or clusters).

For most cloud services, a tiered approach is developed with resources spread over multiple partitioned databases installed in multiple datacenters. Efficient algorithms and addressing schemes have been developed for users to locate resources. When a user wishes to utilize a cloud service, they often authenticate to the service, such as by using a shared secret (e.g., username and password combination, or cryptographic keys, etc.). Further, the user is typically authorized to use particular services for a particular amount of time, and the authorization information can be accessed by the service to identify whether the user can utilize the resource of interest.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

There are many techniques for authenticating (e.g., user authentication) and authorizing transactions to distributed services, such as cloud based services (e.g., web-based applications, databases, etc.). Some require significant computational overhead for cryptographic operations, or database input/output operations for determining access rights, or significant bandwidth and client resources for maintaining and transferring state (e.g., signed tokens, cookies). With some systems, changing access rights may not be immediate as the system honors access tokens until they expire, sometimes hours later. Cryptographic key management is hard, as the resources used to store, manage and decipher these types of keys can be significant. For a signed token based system, the entire security of the distributed services may depend on protecting the private key(s), because if they are hacked, the services can be compromised.

Most cloud based services are stateless and use cryptographically signed tokens for authentication and authorization. This approach allows front end machines (e.g., web servers, application servers) that control access to resources to be stateless. However, this approach has many disadvantages, such as: a complex burden of managing authorization tokens (cookies) is placed on the client performing the API requests; miscoded (or misbehaving) clients can utilize significant front end CPU resources by intentionally (or unintentionally) passing invalid tokens on API requests; front end machines, before allowing access, must validate the signed tokens, which consumes significant CPU overhead performing cryptographic operations, affecting the scalability of the service and the amount of resources a single front end machine can manage; front end machines that verify signed authorization tokens must share the keys used to protect and validate those tokens, which is a difficult management task that must be done securely; and the tokens can be large, thereby creating bandwidth issues, and may be valid for long periods, making it difficult to revoke authorization.

Some cloud services use a random session identified (sessionID) for access to their services. In these services, a user authenticates to the service through some challenge, but then gets issued a sessionID that is used on subsequent requests. However, this category of cloud service merely manages a single resource (e.g., the user's inbox) or co-located resources (e.g., the user's office documents). Further, they cannot handle multiple disparate resources across many locations, each with additional authorization requirements.

Accordingly, one or more techniques and/or systems are disclosed to provide a variation to prior session ID based authorizations, where a location aware, multilevel in-memory store is used to cache authentication and authorization data in a multi-sectioned document. For example, an authorization document can be quickly retrieved and cached at any datacenter, cluster or machine used by the distributed service. The document can be divided into sections that contain authorization data for specific distributed service resources (e.g., web-based applications and services). Further, document sections can be added or removed as needed as resources are accessed.

In one embodiment for providing resource authorization to users of a distributed memory store, an authorization document that is stored in a distributed memory store is accessed using a session ID, which can be provided to a user machine upon user authentication (e.g., a randomly assigned session key). The session ID identifies a location for the authorization document, which comprises a global section with a principal ID associated with the user. The user is authorized for a resource of the distributed service (e.g., cloud resource) if the authorization document has a resource section with authorization data for the resource, associated with the principal ID.

In this embodiment, if the authorization document does not have the resource section for the resource, a local resource section is created (e.g., in the cache of the local app-server or cluster), and identified by a resource identifier. Resource authorization data is loaded into the local resource section, such as from a backup store (e.g., on backend servers), and the authorization document, with the newly created resource section, is saved to the local cache in the distributed memory store for the resource.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
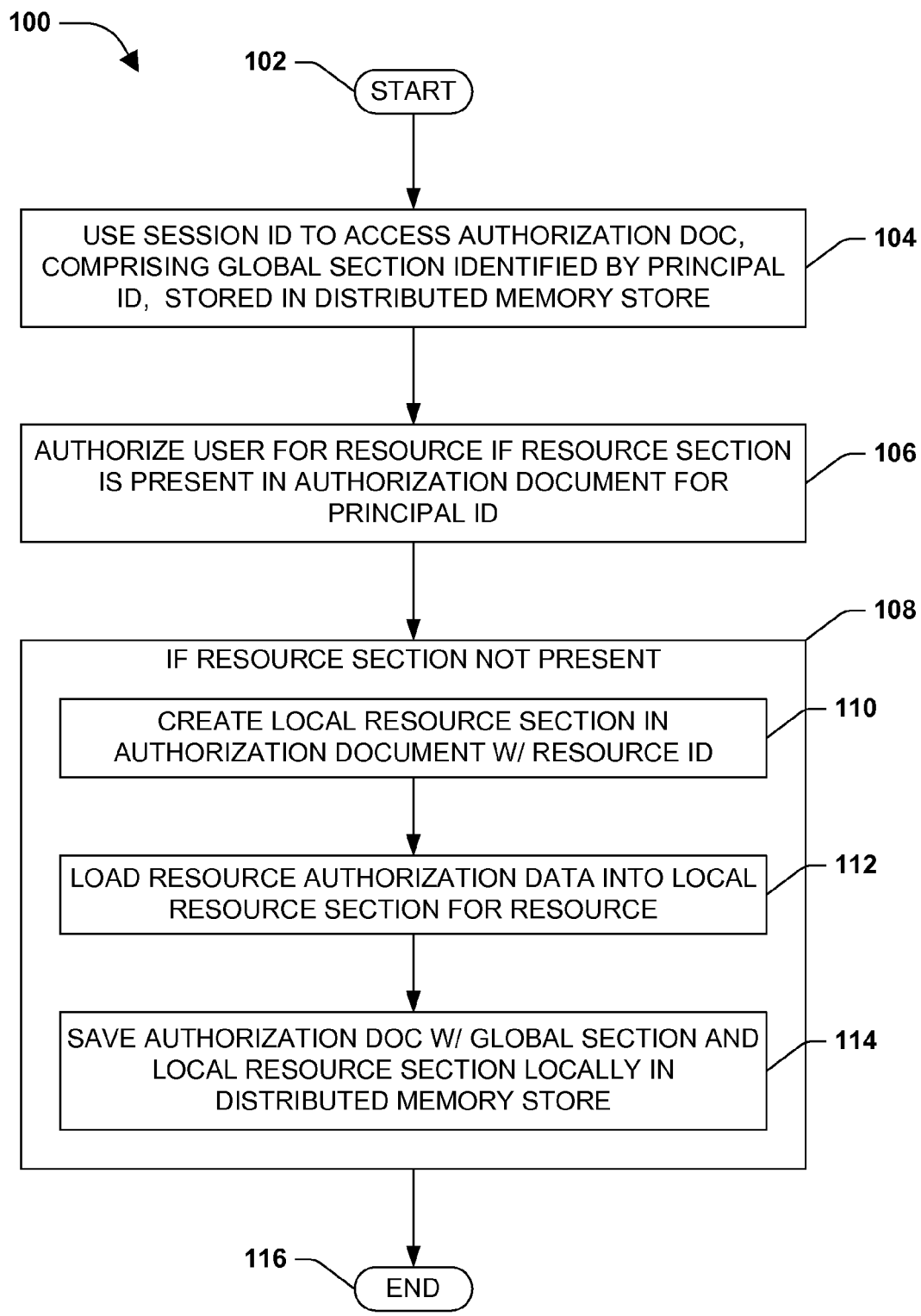
FIG. 1 is a flow diagram of an exemplary method for providing resource authorization to users of a distributed memory store.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a flow diagram of an exemplary method 100 for providing resource authorization to users of a distributed memory store. The exemplary method 100 begins at 102 and involves accessing an authorization document that comprises a global section comprising a principal ID associated with a user, at 104. The authorization document is stored in a distributed memory store and accessed by a session ID that identifies a location of the authorization document. It will be appreciated that the term "user", as provided herein, generally refers to an end user, but is not limited to a human because an end user may also comprise a machine or device. For example, an end user may comprise a person (e.g., authenticated via a name and password) and/or a device (e.g., authenticated via X.509 certificate and public key signature). Moreover, a user (e.g., end user) indirectly uses a distributed memory store such by engaging with online banking, stock services, file synchronization services, online retail, and/or other web-based services/resources that make use of a distributed memory store. Thus, where an indication may be provided herein that resource authorization is provided to users of a distributed memory store, this authorization is generally not provided to the one or more entities that actually make use of the distributed memory store in providing the web-based services/resources to an end user, but instead pertains to the user in the context of that end user attempting to access one or more (online) services/resources (made possible by the existence of/use of the distributed memory store).

By way of example, a distributed memory store can comprise one or more techniques and/or components for setting up in-memory storage that provide unified global caching over distributed memory locations. As an example, web farms often comprise a plurality of servers, some of which are used as web or application servers (e.g., front-end servers for interaction with users), while others are used as database servers (e.g., back-end servers for storing data). In one embodiment, a distributed data grid can be set up on the front-end servers, for example, where a grid service is installed. The grid service allows the respective servers to work together in the distributed data grid, for example, where a global view of the memory of those servers in the grid comprises a unified memory. In this way, in this example, a distributed memory store can be provided, where the physical memory may be disparate (e.g., on different machines), but acts as a unified memory store.

In one embodiment, the distributed memory store (e.g., which can be a distributed dictionary or distributed hash table) can be organized into multiple levels that have shared in-store memory. As an example, memory used by a cloud service (e.g., a service running in the cloud computing environment) can be shared across front-end machines, clusters of machines, and/or data centers that comprises clusters of machines. Therefore, in one embodiment, the distributed memory store for a cloud service, for example, can comprise a local cache (e.g., local to a front-end machine), a cluster master cache (e.g., distributed across a plurality of front-end machines comprising the cluster), and/or a datacenter master cache (e.g., distributed across a plurality of clusters).

Further, in one embodiment, the authorization document can comprise a location aware, multilevel, cached memory store document that comprises individual sections of authorization data associated with specific resources (e.g., cloud resources, such as email). In this embodiment, the authorization document can be cached across respective locations (e.g., datacenters), and the document sections can be cached merely at relevant clusters or machines (e.g., where an associated resource is partitioned). The authorization document comprises a global section that is globally the same throughout the distributed memory store, where other document sections may be local to a resource.

In this embodiment, the authorization document is accessed using the session ID, which identifies its location. In one embodiment, the session ID is merely a small piece of data that identifies a user (e.g., person of machine) using the cloud services, for example, for a desired period of time. The session ID can be randomly generated when a user is authenticated (e.g., logs in with a username and password), and linked to (e.g., by indexing) a session document that comprises the principal ID, which is merely linked to the user (e.g., only the user is associated with the principal ID, and therefore, the authorization document). In this embodiment, the principal ID is an identification that is linked merely to the authorization document, for example, thereby identifying a location of the document.

Figure 2:
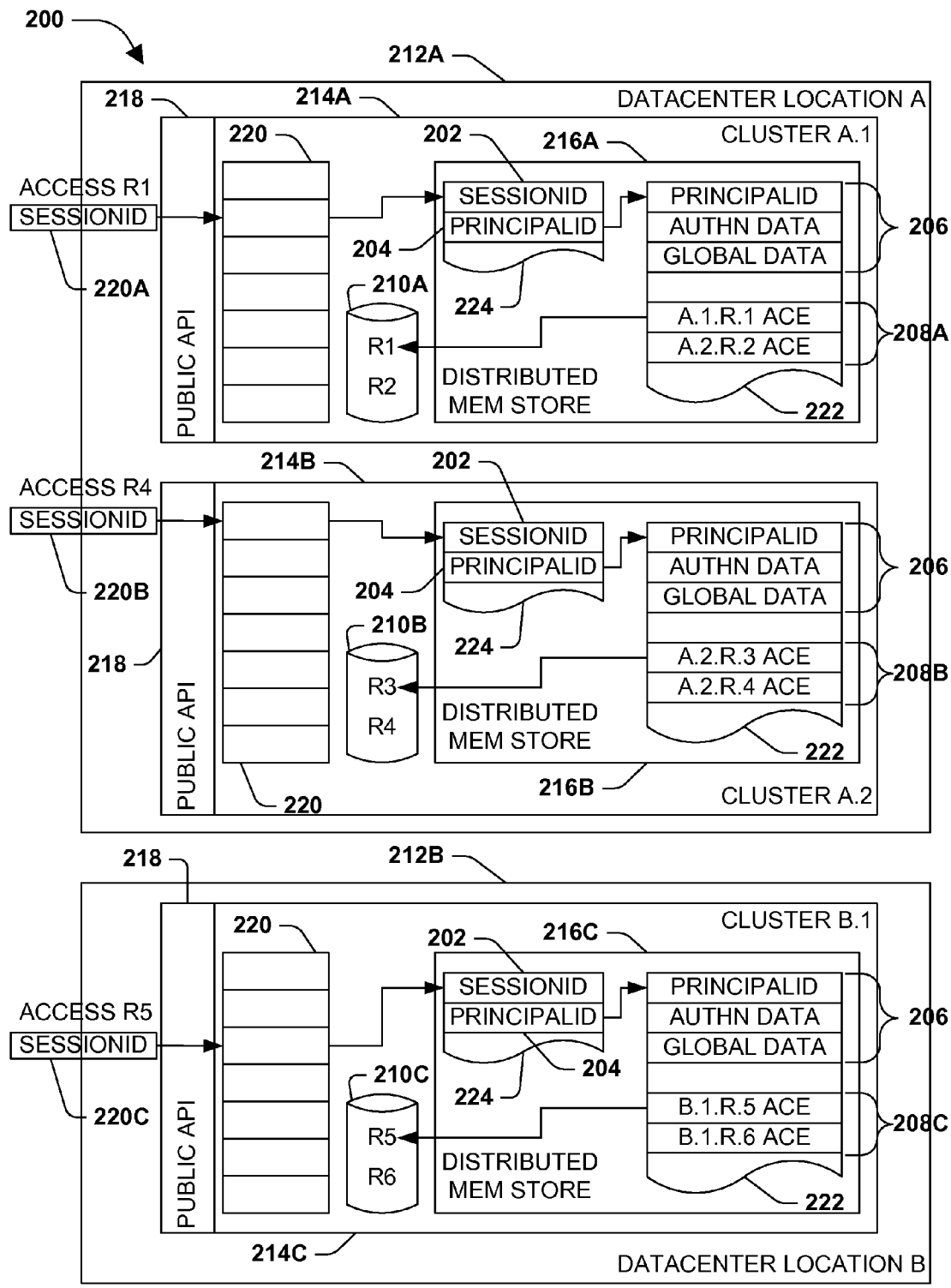
FIG. 2 is a diagram illustrating an example embodiment of a distributed memory store comprising an authorization document.

FIG. 2 is a diagram illustrating an example embodiment 200 of a distributed memory store comprising an authorization document. In this embodiment 200, respective clusters 214A-214C are comprised of machines 220 (e.g., front-end servers), for example, which can be accessed through a public application programming interface 218 (API), such as by web-based users of a cloud service. Further, clusters 214A and 214B can be comprised in one datacenter, datacenter location A 212A, while cluster 214C can be comprised in another datacenter, datacenter location B 212B; illustrating the potential disparate nature of systems associated with a distributed memory store.

Additionally, in FIG. 2, an authorization document 222 is stored across several locations, in the distributed memory store portion 216A of cluster A.1 214A, in the distributed memory store portion 216B of cluster A.2 214B, and in the distributed memory store portion 216C of cluster B.1 214C. In this example 200, the authorization document 222 comprises a global section 206, which comprises the principal ID identifying the user for the document, global authentication data, and other global data. Also, the authorization document 222 comprises a resource section 208A-208C for the respective locations 216A-216C.

In the example embodiment 200 the session ID 202 is associated with the principal ID 204, which identifies the authorization document 222 for the user. The session ID 202 can index a session document 224 stored in the distributed memory store 216, and the session document 224 can comprise the principal IDs 204 for a plurality of user's authorization documents, for example. In this way, in one embodiment, a user (e.g., person or machine) wishing to utilize a remote service (e.g., cloud-based service) can merely authenticate and receive a session ID 202, then use the session ID to locate the principal ID 204, which, in turn, provides access to the authentication document 222.

Returning to FIG. 1, at 106, the user is authorized for a resource if a resource section, comprising resource authorization data, is present for the principal ID in the authorization document. As described above, the authorization document can comprise a global section (e.g., 206 of FIG. 2) and a resource section (e.g., 208A-208C of FIG. 2). While the global section comprises the principal ID related to the user (e.g., associating the user with the authorization document), the resource section provides authorization data that identifies a resource that the user is authorized to access.

As illustrated in FIG. 2, the authorization document 222 cached at the distributed memory store 216A of cluster A.1 214A comprise a resource section 208A. In this example 200, cluster A.1 214A comprises resources R1 and R2 210A, such as cloud-based services accessed by a web-based user (e.g., email, online document storage, etc.). Further, in this example, the resource section 208A of the authorization document 222 comprises resource authorization data that provides access to the resources 210A R1 and R2. Therefore, in this embodiment, if the resource data is present in the resource section of the authorization document 222 identified by the principal ID for the user, the user can be authorized to utilize the resources (e.g., 210A).

Returning to FIG. 1, at 108, if the resource section for the resource is not present in the authorization document, a local resource section can be created in the authorization document for the resource indicated by a resource identifier, at 110. As described above, the authorization document can be cached in a distributed manner in the distributed memory store, for example, such that resource sections are stored locally (e.g., in a local server or cluster where the resource resides in the system) for respective resources, while the global section is cached in another location.

In this embodiment, a new resource section of the authorization document, identified for the user by the principal ID, can be created for the resource locally in the distributed memory store (local to the resource). At 112, resource authorization data is loaded into the local resource section corresponding to the resource. In one embodiment, authorization data can be stored in a backup store associated with the distributed memory store (e.g., the backup store may comprise back-end servers coupled with the remote service). In this embodiment, the appropriate authorization data for the resource (e.g., the user is attempting access) can be loaded from the backup store to the newly created resource section of the authorization document.

Figure 3:
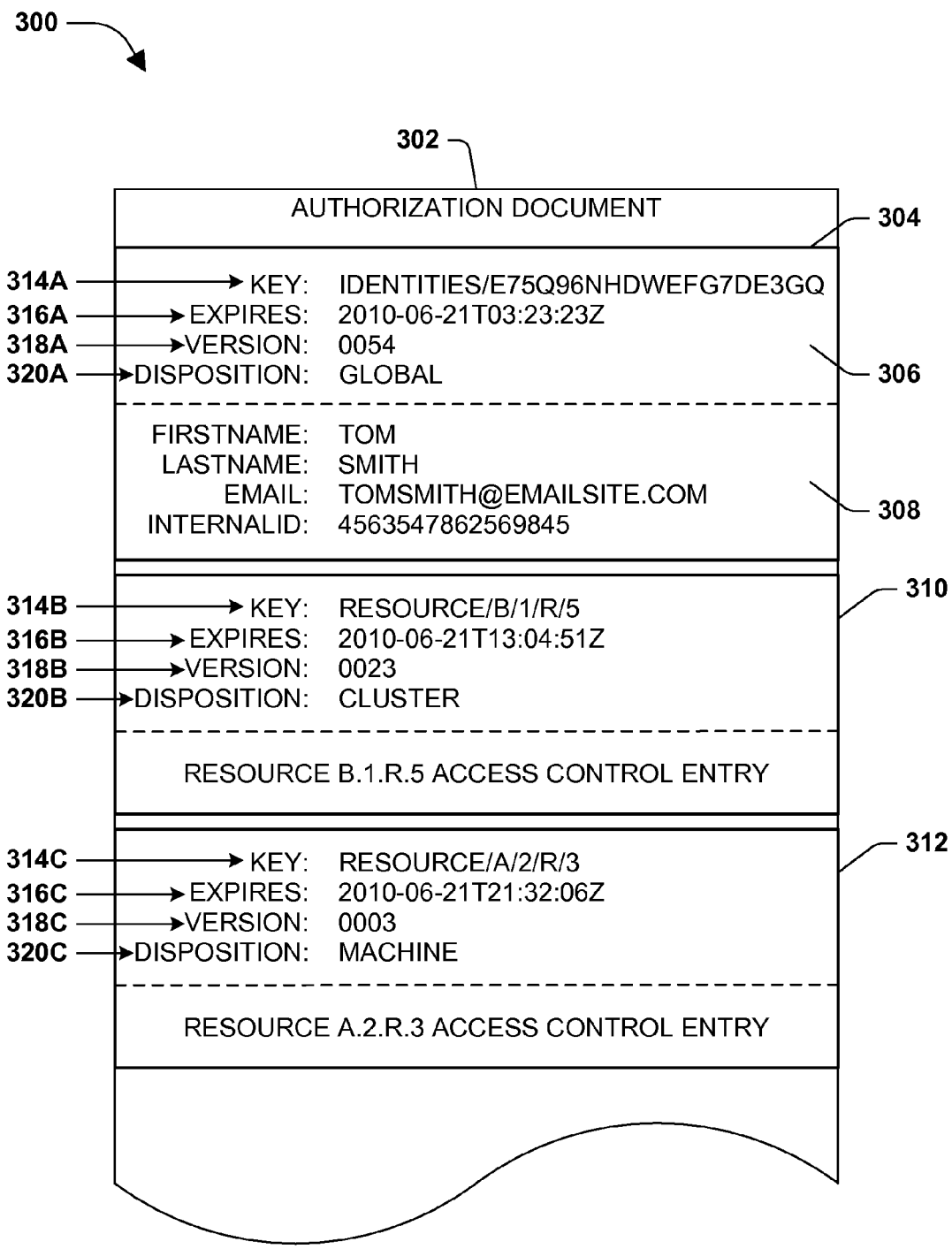
FIG. 3 is an exemplary embodiment of details of an authorization document.

FIG. 3 is an exemplary embodiment 300 of details of an authorization document 302. The authorization document 302 comprises a global section 304, and two resource sections 310 and 312. In this example 300, the resource section for the local machine 312 comprises resource authorization data. The resource authorization data comprises a resource identification key 314C, for example, which may be a unique key that identifies this resource (e.g., cluster or machine). The resource authorization data further comprises an expiration time 316C that identifies when the authorization data expires (e.g., the user is no longer authorized to access the resource unless reauthenticated and reauthorized). Version data 318B, 318C identifies the version of the data, and the disposition 320B, 320C identifies the portion of the service covered by the authorization data (e.g., cluster or machine).

At 114 of the exemplary method 100, of FIG. 1, the authorization document, comprising the global section and the local resource section indicated by the resource identifier, is saved (e.g., cached) locally in the distributed memory store for the resource. For example, as described above, if the resource the user is attempting to access is located on a particular cluster or machine in the cluster, the portion of the authorization document that comprises the newly created resource section for the resource can be stored locally in the distributed memory store, such as in-memory of the machine or cluster.

Having saved the authorization document locally in the distributed memory store, the exemplary method 100 ends at 116.

Figure 4:
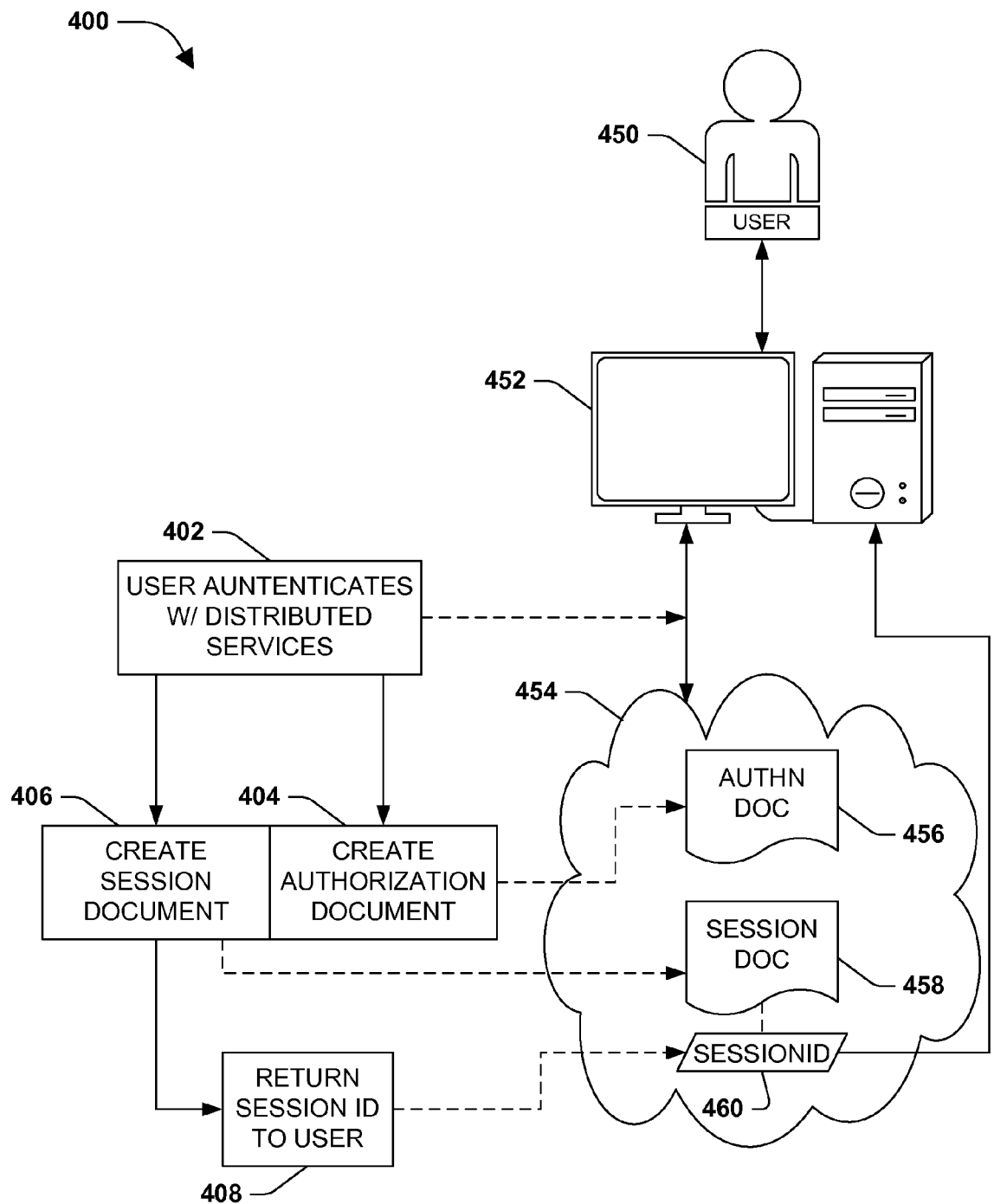
FIG. 4 is a diagram of one embodiment where one or more portions of a method for generating a session ID and authorization document are illustrated.

FIG. 4 is a diagram of one embodiment 400 where one or more portions of a method for generating a session ID and authorization document are illustrated. At 402 a user 450 authenticates with a distributed service, such as a cloud-based service. As an example, authentication of a user often comprises entering a username and password (e.g., a shared secret) into the system in order to authenticate.

It will be appreciated that techniques and/or systems described herein (not just with regard to FIG. 4) are not limited to any particular authentication. For example, an authentication device may be used (e.g., electronic key), a cryptographic key, a public-private key pair, or any other available authentication technique or system. Further, it will be appreciated that the term "user" is not limited to any particular embodiment. For example, a user may be a person interacting with the distributed system though a client (e.g. personal computer), or a device (e.g., authenticated via X.509 certificate and public key signature).

In this embodiment 400, the user 450 uses a computer 452 to authenticate (at 402) with the distributed service 454. Upon authentication, at 404, an authorization document 456 is created for the user 450. As described above, the authorization document 456 comprises a global section that comprises the principal ID associated with the user 450 for the distributed service 454. Further, the global section can comprise user-related information. As an example, as illustrated in FIG. 3, a user-related information section 308 of the global section 304 can comprise information about the user. For example, the user-related information may include a first and last name, email address, and internal identification number for the distributed service.

In one embodiment, the global section is created, when the authorization document is created, such that it can be propagated to requesting memory component of the distributed memory store. That is, for example, as illustrated in FIG. 3, the global section 304 can comprise global authorization data 306, such as a principal ID 314A, expiration 316A, version 318A and type 320A, that can be globally propagated and relevant throughout a system comprising the distributed memory store. Upon creation, the authorization document can be stored in the distributed memory store for the distributed service.

At 406 in FIG. 4, a session document 458, which is indexed in memory of the distributed memory store by the session ID 460, can also be created upon authentication. As an example, the session document can comprise a principle ID for a user with the distributed service 454, where the principal ID is indexed by the session ID. In this way, for example, when a user authenticates with the distributed service 454, the session document 458 is created for the user, such that the session document comprises the user's principal ID for the service, and a session ID 460 indexes the principal ID in the session document.

Therefore, in this example, merely a randomly generated session ID may be needed to access the distributed service, as the principal ID can be retrieved from the session document using the session ID. At 408, the session ID 460 can be returned to the user's machine 452. In this way, as an example, the user's machine can utilize the session ID for any subsequent requests for services in the distributed services 454, during a life set for the session ID (e.g., often limited to twenty-four hours of use by an expiration setting).

Figure 5:
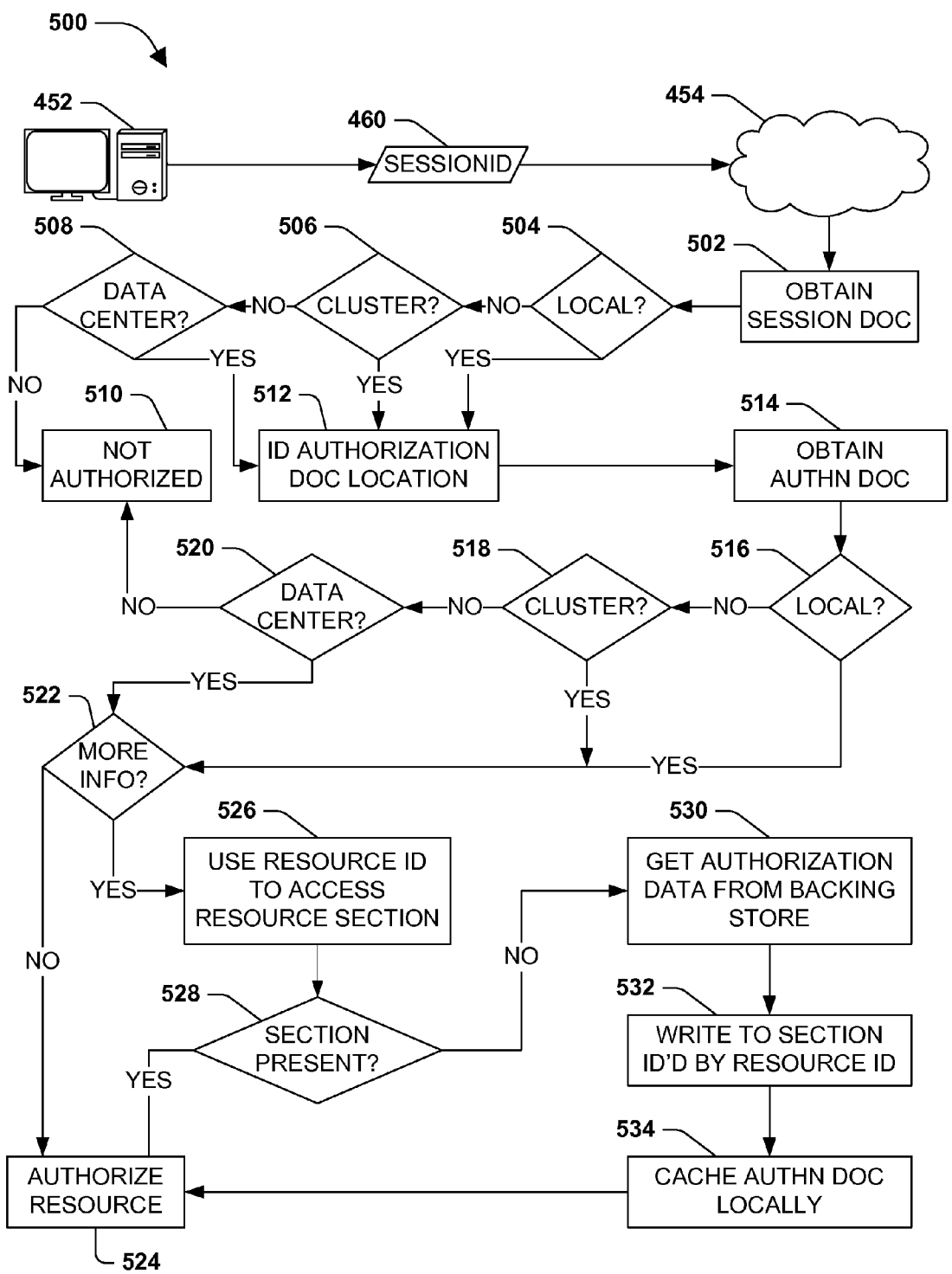
FIG. 5 is a flow diagram of an exemplary embodiment of one or more portions of a method where a session ID can be used to authorize a resource for a user.

FIG. 5 is a flow diagram of an exemplary embodiment 500 of one or more portions of a method where a session ID can be used to authorize a resource for a user. In this embodiment 500, a request for use of a distributed service can be sent from the user's machine 452 to the distributed service 454, where the request comprises the session ID 460 and the resource may be in a cloud and/or cluster. As an example, during the valid life of the session ID (e.g., prior to its expiration time), the session ID can be forwarded with any request to access distributed services, such as cloud-based services.

At 502, the session document is accessed. As an example, the session ID 460 can be used as a key into the in-memory distributed store to obtain the session document. At 504, if the session document is not cached locally (e.g., in the front-end machine accessed by the user's machine), the distributed memory store can look to the master cache of the cluster comprising the local machine (NO at 504). At 506, if the session document is not cached in the cluster master cache, distributed memory store can look to the master cache in the datacenter comprising the cluster (NO at 506). At 508, if the session document is not cached in the datacenter (NO at 508) the request is rejected as unauthorized, at 510.

Alternately, if the session document is found in the distributed memory store (YES at 504, 506, or 508) the session ID can be used to identify the principal ID, and thereby used to identify a location of the authorization document, at 512. In one embodiment, the session document may merely comprise a redirection point that redirects the session ID, which is a pointer to the session document, to the principal ID, which points to the authorization document.

At 514, the authorization document can be accessed, such as by using the principal ID. In one embodiment, the machine (e.g., server) that receives the authorization request from a user, for example, may merely request access to the authorization document, if it is stored locally. Otherwise, in this embodiment, the machine may request that the authorization document, comprising the global section, is propagated locally to the resource in the distributed memory store if the authorization document is not cached locally to the resource.

At 516, if the authorization document is not cached locally (NO at 516, the distributed memory store can look to the master cache for the cluster, which comprises the local machine. At 518, if the authorization document is not cached in the cluster comprising the local machine (NO at 518), the distributed memory store can look to the master cache of the datacenter. If the authorization document is not cached in the datacenter (NO at 520) the request is rejected as unauthorized, at 510.

Alternately, if the session document is found in the distributed memory store (YES at 504, 506, or 508) the authorization of the resource for the user, for example, can proceed. The authorization check may or may not need more information before granting access to the resource. For example, merely providing the principle ID to access the authorization document (NO at 522) may be sufficient to authorize access to the resource, at 524, such as when the authorization document is merely linked to one resource for the distributed service. However, if the authorization document comprises resource sections for more than one resource (e.g., 310, 312 of FIG. 3), more information may be needed to authorize the user for the resource (YES at 522).

At 526, a resource ID can be used to access the resource section of the authorization document, for the requested resource. The resource ID, for example, may be an identification that is particular to the resource (e.g., 314B, 314C of FIG. 3). In this way, in this example the resource ID can identify the resource section, which comprises the resource data needed to authorize the user for the resource. At 528, if the resource section is present, as identified by the resource ID, (YES at 528), the resource can be authorized for the principal ID, at 524.

At 528, if the resource section is not present in the authorization document (NO at 528), authorization data can be retrieved from a backing store. For example, where the authorization document was propagated from a different cluster than the one comprising the requesting machine (e.g., a web-server receiving the user request), merely the global section may be propagated to the local portion of the distributed memory store. This may occur, for example, when the user has not attempted to access the distributed service from the local cluster within an expiratory period for the authorization document.

At 530, a version of the resource authorization data can be loaded as an update from the backing store, and written to a newly created resource section that is identified by the resource identification, in the authorization document, at 532. As an example, the backing store can comprise back-end servers in a datacenter, for a distributed service, that are used to store operational data, such as customer related information that typically needs longer-term storage. In this way, as an example, the authorization data is written to the resource section, which is identified by the resource ID for the associated resource. In one embodiment, an expiration time can be added to the local resource section, which comprises a time for the user to access the resource (e.g., 316B, 316C of FIG. 3).

At 534, the authorization data is cached locally, such as on the local machine receiving the authorization request from the user. In one embodiment, the authorization document can be pushed to a next master cache level in the distributed memory store. For example, the authorization document can be pushed from the local machine cache to the master cache for the cluster comprising the local machine; or it can be pushed from the master cache for the cluster to the master cache for the datacenter.

In one embodiment, the version of the updated authorization document (e.g., updated from the backing store), can be checked against the master cache version, such as by a distributed memory store update process. In this embodiment, if the updated version is a later version, the master cache at that level is also updated. However, if the updated version is not a later version than the master cache (e.g., a subsequent update came through before the updated version was pushed to the master cache), the master version is not updated.

In this embodiment, the updated document section can be returned in the update. In this way, for example, the master cache can comprise the latest version of any updated document sections, and cache updates can provide the latest versions. In one embodiment, an expiration time can be added to the authorization document, which comprises a time for the user to access the authorization document. In this way, for example, the distributed services may provide for the user to reauthenticate and reauthorize after a desired period of time. Having cached the updated authorization document, the user can be authorized, at 524.

In one aspect, one may wish to modify a user's authorization for a resource in a distributed service (e.g., cloud network environment). For example, a user's activities with regards to a particular service may prompt an administrator to prevent them from further access (e.g., spammers using email services). However, the authorization data may comprise an expiration that allows the user to continue their authorization. In this aspect, in one embodiment, the authorization in the resource section of the authorization document can be modified (e.g., removed, expiration changed, etc.).

In one embodiment, modifying authorization in the resource section of the authorization document can comprise receiving a request to modify the authorization, which indicates the resource ID for the intended resource, and the principal ID for the user. In this embodiment, the authorization document can be accessed using the principal ID, and the resource section can be accessed using the resource ID. As an example, the expiration information for the resource can be reset, or the resource section for the resource may be removed. In this embodiment, the authorization document, comprising the modified resource section, can be saved in memory in the distributed memory store, for example, thereby preventing (e.g., or extending) access by the user.

Figure 6:
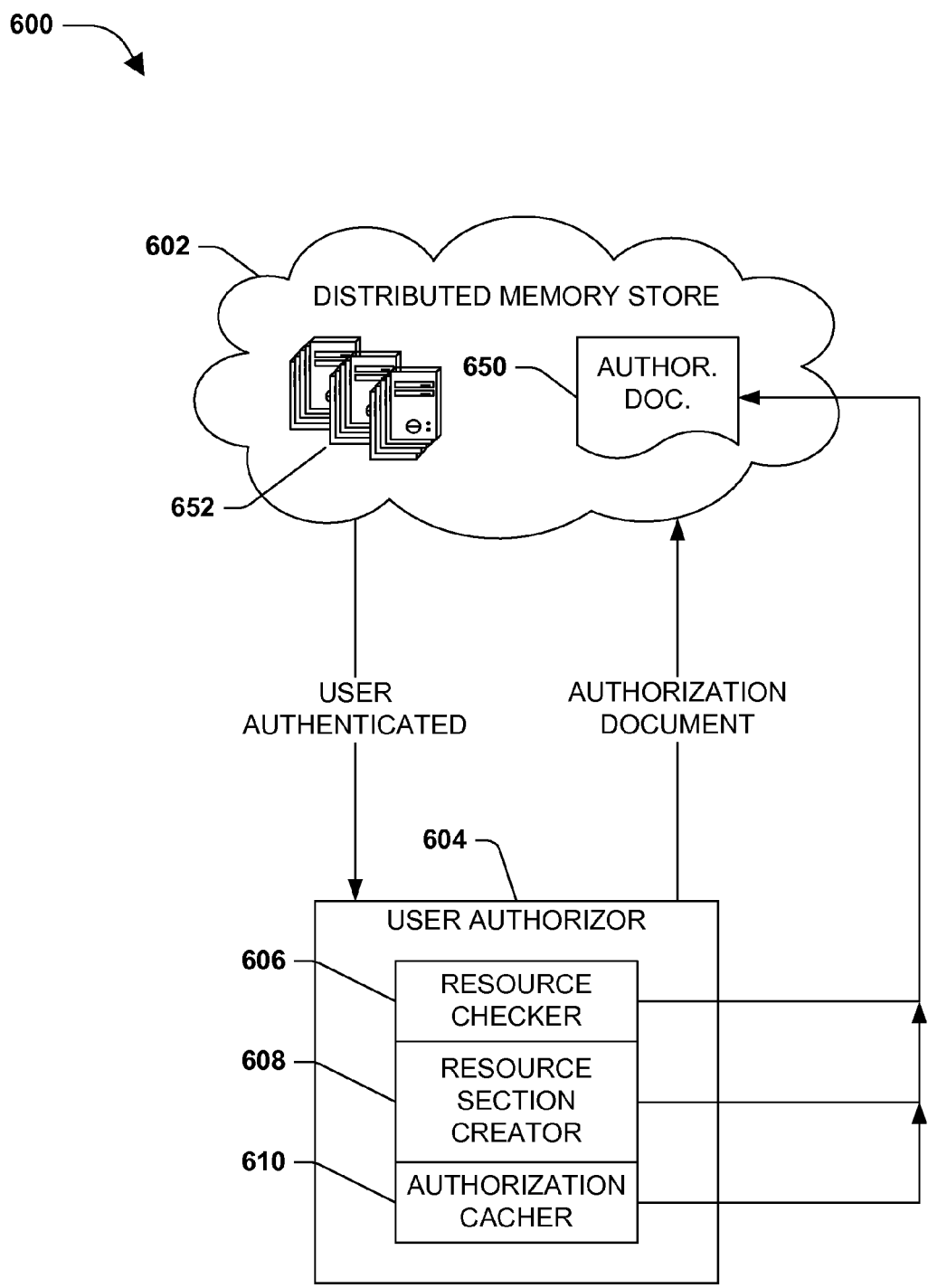
FIG. 6 is a component block diagram of an exemplary system for providing resource authorization to users of a distributed memory store.

A system may be devised that utilizes a location aware, multilevel, cached memory store document to authorize a user, for example, for specific distribute services (e.g., cloud computing services). FIG. 6 is a component block diagram of an exemplary system 600 for providing resource authorization to users of a distributed memory store. A distributed memory store 602 comprises memory components 652 configured to store resource authorization data.

A user authorization component 604 is operably coupled with the distributed memory store 602, in order to create an authorization document 650, upon user authentication. The authorization document 650 is identified by a principal ID that is related to a user, and it comprises a global section that is configured to be propagated to memory components 652 of the distributed memory store 602 upon request. The user authorization component 604 comprises a resource checking component 606 that authorizes the user for a resource if a resource section, comprising resource authorization data, is present for the principal ID in the authorization document 650.

The user authorization component 604 further comprises a resource section creation component 608 that creates a local resource section in the authorization document 650 for the resource, which is indicated by a resource identifier. The local resource section is created by loading resource authorization data into the local resource section corresponding to the resource, if the resource section for the resource is not present in the authorization document 650. The user authorization component 604 also comprises an authorization caching component 610 that saves the resource document 650, comprising the global section and the local resource section indicated by the resource identifier, locally for the resource in the distributed memory store 602.

Figure 7:
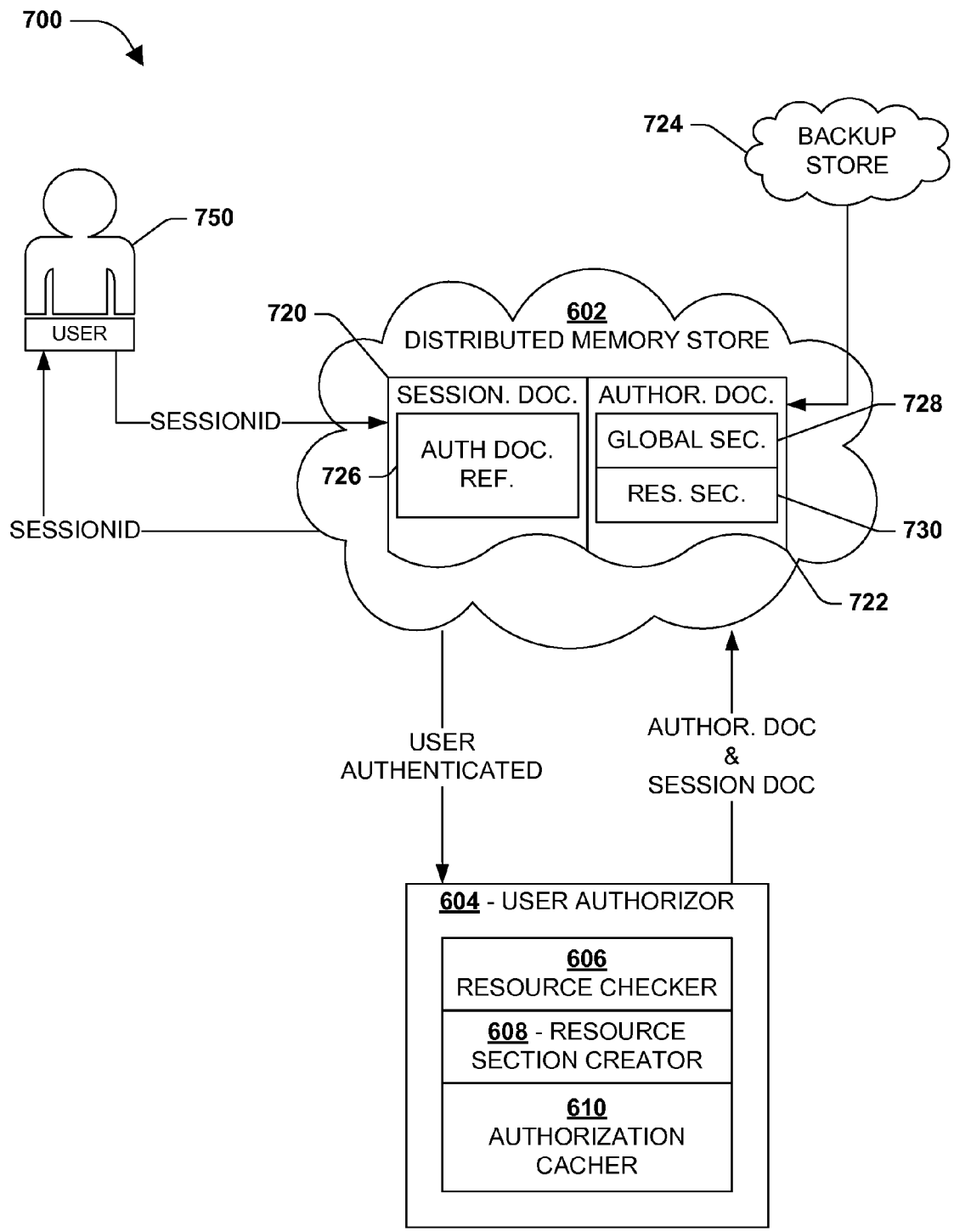
FIG. 7 is a component block diagram illustrating one embodiment where one or more systems, described herein, can be implemented.

FIG. 7 is a component block diagram illustrating one embodiment 700 where one or more systems, described herein, can be implemented. Upon user authentication, user authentication component can create a session document 720 that is indexed in memory of a distributed memory store 602 by a session ID that comprises a reference to an authorization document 722 for an authenticated user 750. In this embodiment, the user 750 can authenticate (e.g., using a shared secret, cryptographic key, or some other authentication technique), the session document 720 is created with a reference 726 to the authorization document 722, and the session ID that indexes the reference 726 is sent back to the user 750.

Further, the session document 720 is stored in memory of the distributed memory store 602 and comprises the authorization document access component (reference 726), where the authorization document access component is accessed by the session ID for a user's session. That is, when a user attempts to access a distributed service that utilizes the distributed memory store 602 the user's computing device can send the session ID along with an authorization request. In this way, in this example, the session ID can be used to access the authorization document reference 726, which in turn allows the user to access the authorization document 722 on the distributed memory store 602.

A backup store 724 is operably coupled with the distribute memory store 602, and it provides resource authorization data for a resource section 730 in the authorization document 722. For example, the backup store may be comprised in backend servers of a server farm, and can store the authorization data used to give user authorization, in the resource sections of authorization documents.

In one embodiment, when the authorization document 722 is stored locally (e.g., on a server that is local to the resource being accessed by the user) it can comprise a global section 728, which comprises a principal ID and user-related information, and a resource section 730, which comprises resource authorization data for the local resource. That is, for example, a user 750 can attempt to access a distributed resource service (e.g., online word processor) by connecting to an application server providing the service, such as in a web-server farm. The authorization document can be stored locally on the application server, or in the local cluster comprising that server, and it can comprise the global section 728 for the user authorization information, and the resource section 730 that identifies the resource the user is authorized to access (e.g., the word processor).

In one embodiment, the distributed memory store 602 can comprise a local cache, such as on a local machine (e.g., front-end web server or application server providing content to web users). Further, in one embodiment, the distributed memory store 602 can comprise a master cache for a cluster comprising the distributed memory store. For example, a cluster can comprise a plurality of front-end machines serving web content to users, and the distributed memory store can be implemented in the cluster, where the cluster comprises a master cache. In one embodiment, the distributed memory store 602 can comprise a master datacenter cache for the one or more clusters comprising the distributed memory store.

Figure 8:
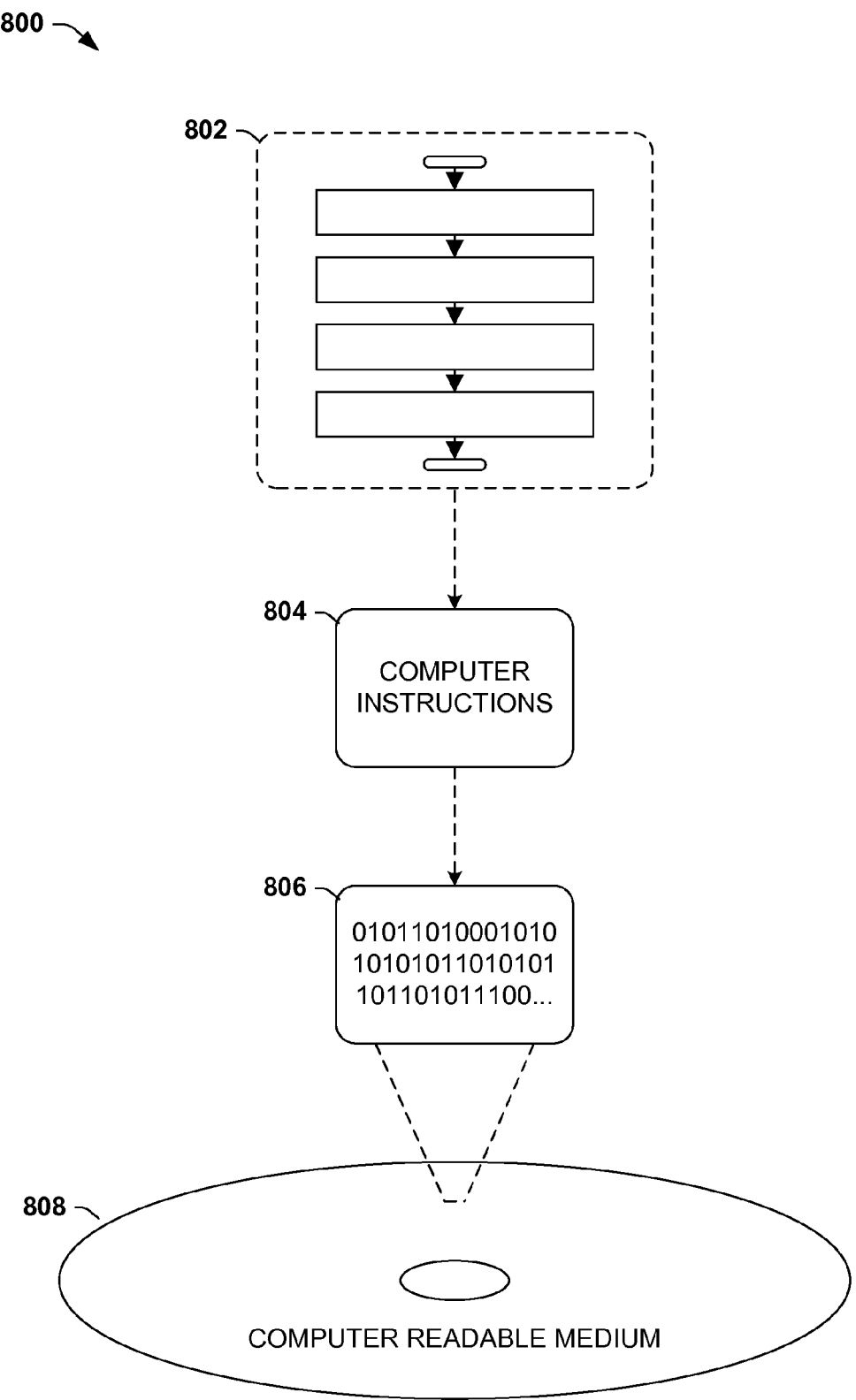
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium

808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as the exemplary method 100 of FIG. 1, for example. In another such embodiment, the processor-executable instructions 804 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
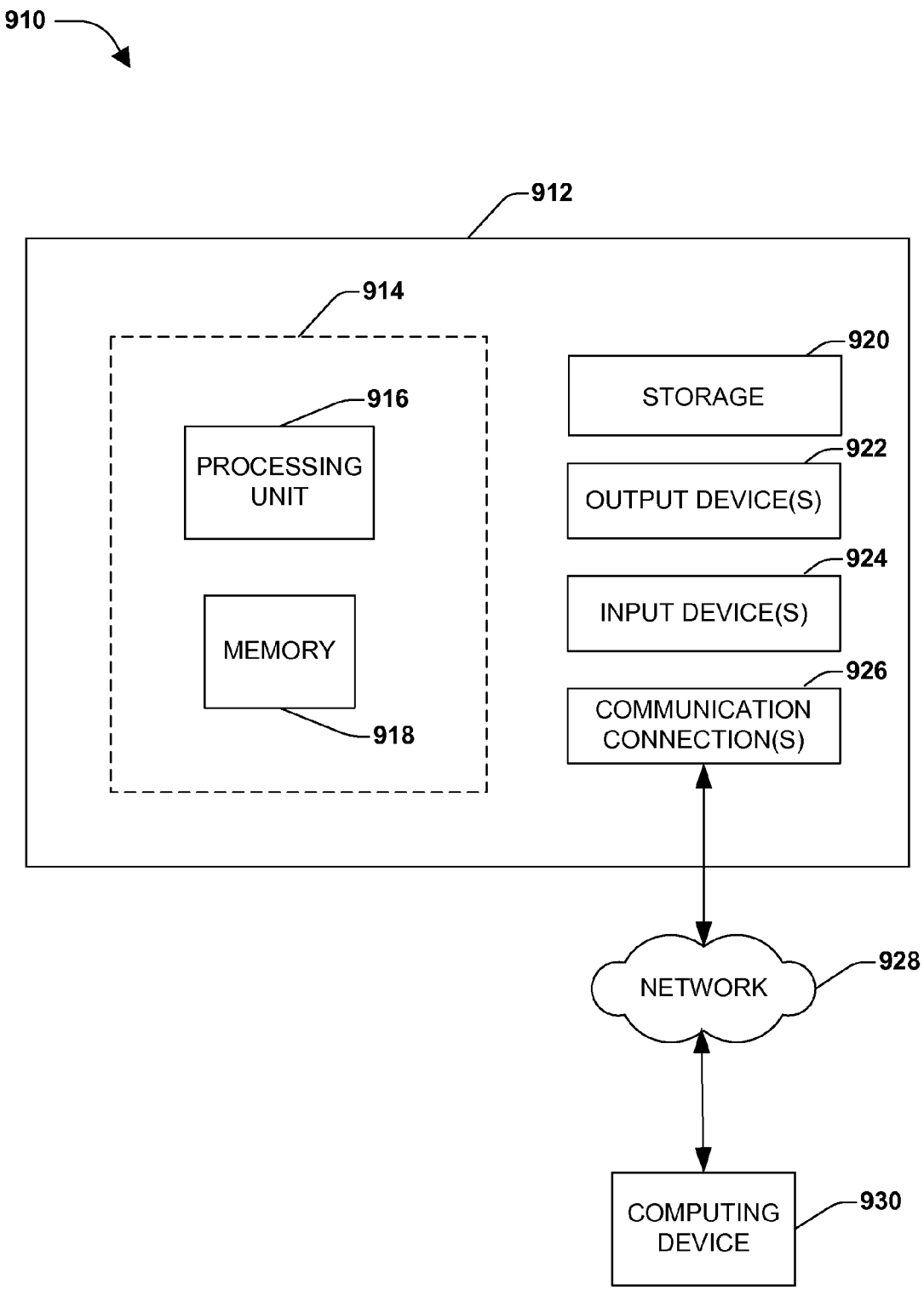
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at least in part via a processing unit, for providing authorization to a user for a distributed service stored in a distributed memory store, comprising:
   accessing an authorization document stored in the distributed memory store; and
   responsive to determining that a resource section for the distributed service is not present in the authorization document:
      creating the resource section in the authorization document for the distributed service such that merely one or more instances of the authorization document that are comprised in a location where one or more resources of the distributed service are partitioned comprise the resource section and instances of the authorization document that are comprised in a second location where at least one resource of the distributed service is not partitioned do not comprise the resource section, the one or more resources not comprising at least some of the resource section;
      loading resource authorization data, from a backing store, into the resource section in the authorization document; and
      saving the authorization document.

2. The method of claim 1, the authorization document saved locally in the distributed memory store.

3. The method of claim 1, the accessing comprising using a session ID that identifies a location of the authorization document.

4. The method of claim 1, comprising authorizing the user for a second distributed service if a second resource section for the second distributed service is determined to be present in the authorization document.

5. The method of claim 1, comprising authorizing the user for the distributed service after the saving.

6. The method of claim 1, comprising providing a session ID, usable to access the authorization document, to the user upon user authentication.

7. The method of claim 1, comprising updating the resource authorization data.

8. A system for providing authorization to a user for a distributed service stored in a distributed memory store, comprising:
   one or more processing units; and
   memory comprising instructions that when executed by at least some of the one or more processing units, perform a method comprising:
      accessing an authorization document stored in the distributed memory store; and
      responsive to determining that a resource section for the distributed service is not present in the authorization document:
         creating the resource section in the authorization document for the distributed service such that merely one or more instances of the authorization document that are comprised in a location where one or more resources of the distributed service are partitioned comprise the resource section and instances of the authorization document that are comprised in a second location where at least one resource of the distributed service is not partitioned do not comprise the resource section, the one or more resources not comprising at least some of the resource section; and loading resource authorization data into the resource section.

9. The system of claim 8, the authorization document saved locally in the distributed memory store.

10. The system of claim 8, the accessing comprising using a session ID that identifies a location of the authorization document.

11. The system of claim 8, the method comprising authorizing the user for a second distributed service if a second resource section for the second distributed service is determined to be present in the authorization document.

12. The system of claim 8, the method comprising authorizing the user for the distributed service after saving the authorization document.

13. The system of claim 8, the method comprising providing a session ID, usable to access the authorization document, to the user upon user authentication.

14. The system of claim 8, the method comprising updating the resource authorization data.

15. A computer readable storage medium, excluding signals, comprising instructions that when executed, perform a method for providing authorization to a user for a distributed service stored in a distributed memory store, the method comprising:

accessing an authorization document stored in the distributed memory store; and responsive to determining that a resource section for the distributed service is not present in the authorization document:

creating the resource section in the authorization document for the distributed service such that merely one or more instances of the authorization document that are comprised in a location where one or more resources of the distributed service are partitioned comprise the resource section and instances of the authorization document that are comprised in a second location where at least one resource of the distributed service is not partitioned do not comprise the resource section.

16. The computer readable storage medium of claim 15, the authorization document saved locally in the distributed memory store.

17. The computer readable storage medium of claim 15, the accessing comprising using a session ID that identifies a location of the authorization document.

18. The computer readable storage medium of claim 15, the method comprising authorizing the user for a second distributed service if a second resource section for the second distributed service is determined to be present in the authorization document.

19. The computer readable storage medium of claim 15, the method comprising authorizing the user for the distributed service after saving the authorization document.

20. The computer readable storage medium of claim 15, the method comprising providing a session ID, usable to access the authorization document, to the user upon user authentication.

* * * * *